UNITED STATES PATENT OFFICE.

AUGUST HOLLE, OF DÜSSELDORF, GERMANY, ASSIGNOR TO MASCHINENBAU-AKTIEN-GESELLSCHAFT BALCKE, OF BOCHUM, GERMANY.

PROCESS OF PREVENTING THE DEPOSITION OF SCALE OR SLUDGE FROM THE COOLING WATER IN SURFACE STEAM CONDENSERS.

1,405,783. Specification of Letters Patent. Patented Feb. 7, 1922.

No Drawing. Application filed May 28, 1919. Serial No. 300,489.

*To all whom may concern:*

Be it known that I, AUGUST HOLLE, chemist, a citizen of the German Republic, residing at 75 Karl Str., Düsseldorf, Germany, have invented certain new and useful Improvements in the Process of Preventing the Deposition of Scale or Sludge from the Cooling Water in Surface Steam Condensers, (for which I have filed applications in Germany, Feb. 19, 1918; Austria, Sept. 12, 1918; Hungary, Sept. 19, 1918; France, Sept. 30, 1918; Belgium, Oct. 31, 1918, and Italy, Oct. 15, 1918;) and I do hereby declare the following to be a full, clear, and exact description of the invention, such as will enable others skilled in the art to which it appertains to make and use the same.

This invention relates to a new process or method of preventing the deposition or precipitation of scale or sludge from the cooling water in surface steam-condensers.

It is well known that the efficiency of surface condensers is quickly impaired by deposits of scale or sludge from the cooling water. In order to prevent the vacuum from being reduced or destroyed, it is necessary to remove the scale or incrustations from time to time, by cleaning the condenser thoroughly. The removal of the scale is generally effected by means of free acids which corrode the scale and which must be used in excess if the cleaning process is to be completed within a reasonable time. Acids not used in excess would require some weeks for the complete removal of scale. Chemical agents in excess, however, not only destroy the scale but also the iron portions of the condenser and the brass cooling tubes. The chemical cleaning process thus shortens the life of the condenser and leads to its premature destruction.

In order to avoid this expensive and harmful cleaning process for condensers, it has been proposed to prevent the deposition of scale from the cooling water by chemically purifying the cooling water before supplying it to the condenser. The apparatus required is, however, very expensive for condensers which work with re-cooling plants for the cooling water as regards first costs as well as the working, while it is practically prohibitive for fresh-water condensers. It has also been proposed to effect the chemical purification by introducing the chemicals directly into the supply pipes for the cooling water. This method must be condemned as the condenser as well as the cooler would quickly become choked with sludge (consisting of precipitated impurities) and the action of the chemicals could not be relied on. These drawbacks of the known methods are avoided by the present process according to which the production of scale and sludge in the condenser from the cooling water is prevented by converting the scale-producing salts of the cooling water into such chemical compounds as will not be precipitated from the cooling water, even if the water is heated. The salts in the cooling water which produce scale or sludge consist essentially of calcium carbonate, magnesium carbonate, calcium sulphate and magnesium sulphate. The carbonates are soluble in water only with great difficulty and therefore are easily precipitated from it. More easily soluble are the sulphates, especially magnesium sulphate. These are consequently only precipitated when the water is saturated with them.

From this it follows that the sulphates do not precipitate in fresh-water condensers and in re-cooling plants only when by the evaporation in the cooler a complete saturation of the cooling water has taken place. This saturation can be prevented by introducing into the cooler not only the quantity of water which is evaporated but also a suitable excess over the quantity to be replaced.

The carbonates are precipitated already when the cooling water is only warmed, in fresh-water plants as well as in re-cooling plants. In the latter case the precipitation takes place quicker than in connection with fresh water installations.

According to the present invention the precipitation is prevented by chemically fixing the scale-forming salts in the cooling water. The water is not purified but the scale-formers are so fixed that under no circumstances can they be precipitated. This method of chemical fixation may be carried into effect, for instance by adding free acids to the cooling water. Suitable acids for this purpose are hydrochloric acid, acetic acid, formic acid and the like, in predetermined quantities. By this addition of acids the carbonates are converted into calcium chloride, magnesium chloride, calcium formate, calcium acetate and so on. All these salts are easily soluble in water, for instance, about 4000 grams of calcium chlorid or magnesium chlorid can readily be dissolved in a liter of cold water, while on the other hand not over 2 grams of calcium sulfate, and only 0.02 to 0.04 grams of calcium carbonate or about 0.02 grams of magnesium carbonate can be dissolved in a liter of water. The salts obtained by such addition of the acids do not precipitate or only are precipitated when in excessive concentration which in view of the solubility of the salts can easily be prevented. Acidulation of the water can be avoided by exactly controlling the addition of acid.

What I claim is:—

A process of keeping a surface condenser free from scale and sludge, which comprises adding to the cooling water, a free acid which is capable of converting the carbonates and sulfates of a scale-producing nature into easily soluble salts, such acid being added in amount sufficient to convert the scale-producing substances into readily soluble salts without leaving any injurious excess of acid, and feeding such water to a surface condenser.

In testimony whereof I hereunto affix my signature in the presence of two witnesses.

AUGUST HOLLE.

Witnesses:
 FRIEDRICH BRENNINGER,
 WILHELM FÜLBERTH.